Sept. 20, 1966     E. J. BARUTH ETAL     3,273,178
METHOD AND MEANS FOR SECURING SEAT COVERS TO THE
BASE STRUCTURE OF A SEAT
Filed June 22, 1964
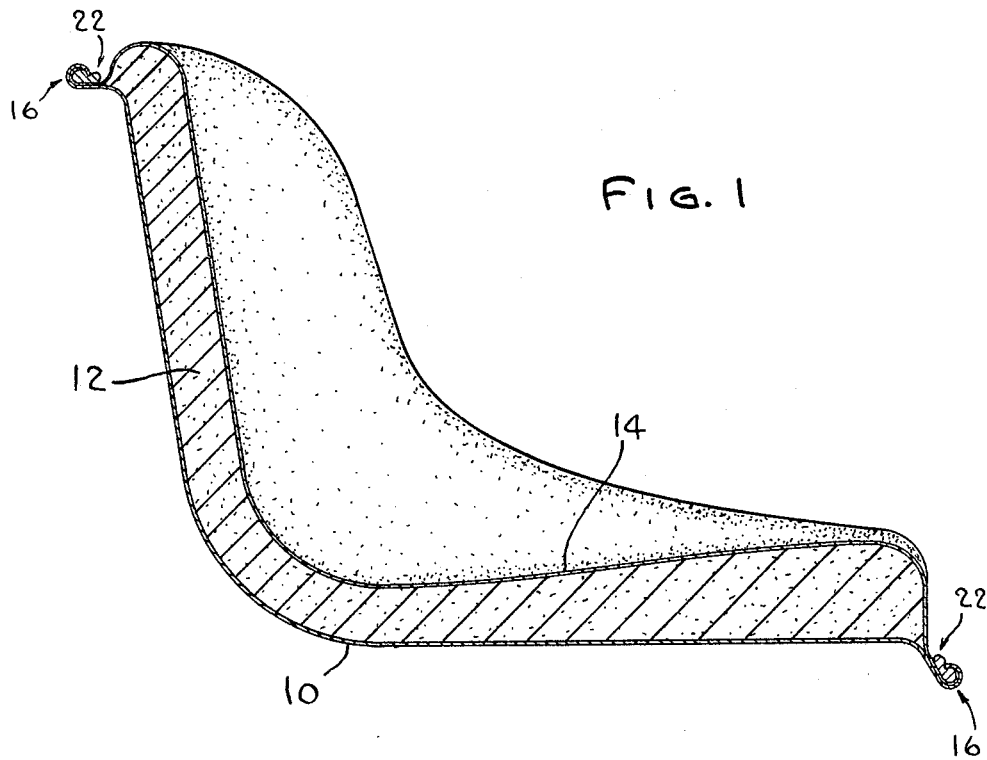
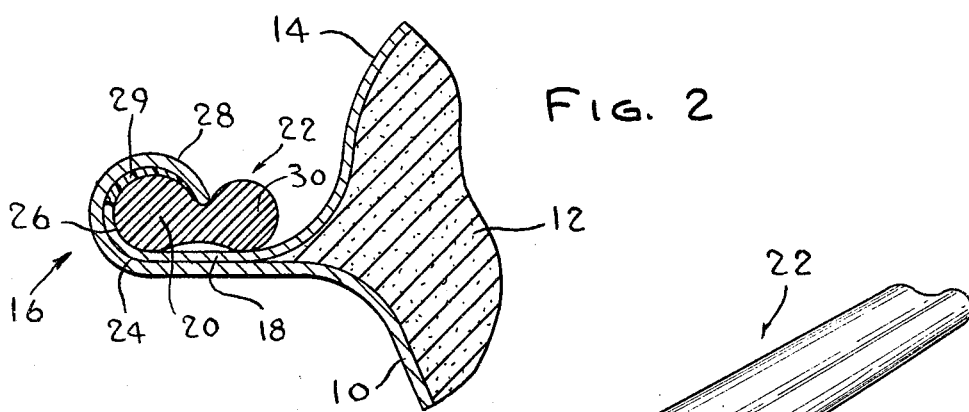
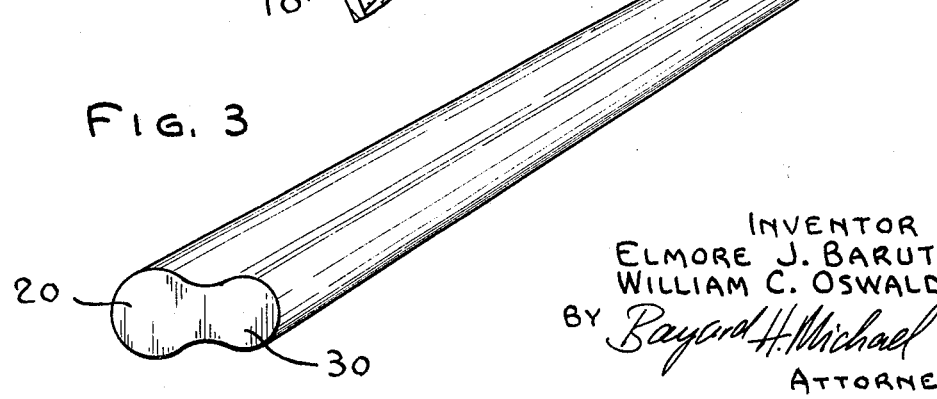
INVENTOR
ELMORE J. BARUTH
WILLIAM C. OSWALD
BY Bayard H. Michael
ATTORNEY

United States Patent Office 3,273,178
Patented Sept. 20, 1966

3,273,178
METHOD AND MEANS FOR SECURING SEAT COVERS TO THE BASE STRUCTURE OF A SEAT
Elmore J. Baruth and William C. Oswald, Milwaukee, Wis., assignors to Bostrom Corporation, Milwaukee, Wis., a corporation of Wisconsin
Filed June 22, 1964, Ser. No. 376,974
8 Claims. (Cl. 5—353.2)

This invention pertains to improvements in the method and means for securing seat covers to the base structure of a seat.

The primary object of this invention is to provide a stronger and more economical permanent connection between the seat cover and the base structure of the seat than has been known heretofore.

This object is attained by providing a C-shaped member on the peripheries of the seat structure and retaining the terminal portions of the seat cover therein by means of a welt and firmed or hardened bonding material, which serves to bond the welt to the terminal portion as well as to increase the size of the firm mass within the C-shaped member and thereby to provide a stronger mechanical interlock with the C-shaped member.

In assembly, the bonding material is applied to the terminal portion in liquid form. The welt is inserted into the C-shaped member after the terminal portion and during such insertion forces part of the bonding material to move in a space between the welt and the inside surface of the C-shaped member, such space being of a larger cross-sectional area than normally required for bonding parts of this type to each other. After hardening, the bonding material forms a firm mass, and the mass contained in said space serves to provide the increase in the mechanical interlock of the parts.

The welt may be of a two lobed contour with the edge of the C-shaped member being in engagement with the portion between the two lobes of the welt. Because of this construction any cutting or rubbing of the edge, which might be present in some constructions, because of unfavorable stacking in tolerances or other variances in production or use, will only cause some wear of the welt, but will in no way damage the relatively thin seat cover. Further, this type of welt design avoids the unsightly seepage of glue past the edge of the C-shaped member, which could be expected, if the C-shaped member were filled entirely with the bonding agent. It is also of note that by filling the greater portion of the C-shaped member with the welt, the bonding material consumption is kept at its minimum.

Other objects and advantages will be pointed out in, or be apparent from, the specification and claims, as will obvious modifications of the single embodiment shown in the drawings, in which:

FIG. 1 is a cross-sectional view of a seat embodying the present invention;

FIG. 2 is an enlarged cross-sectional view of the connection between the seat cover and the seat pan; and FIG. 3 is a perspective view of the welt employed in securing the seat cover to the seat pan.

Referring to the drawings in detail, the seat shown in FIG. 1 is of a generally dished shape as commonly used on tractors and similar machinery and is comprised of a contoured metal pan 10, a polyurethane foam cushion 12 and a seat cover 14 fixed at its edges to the seat pan.

The novelty of this invention resides in the manner of securing the cover to the seat pan to thereby provide a unitary structure.

The seat pan is provided with a C-shaped edge 16, which receives the terminal portion 18 of the cover extending beyond the cushion, and which also receives lobe 20 of a two lobe welt 22. An epoxy bond is provided between the terminal portion and the seat pan at 24 and between the terminal portion and the lobe 20 at 26. Lobe 20 is of such contour as to define a space between the lobe and the inside wall of the jaw 28 of the edge, and the space is filled with relatively firm epoxy 29, which adheres to the inside wall as well as to the lobe 20.

In manufacturing, the seat pan including its C-shaped edge and the seat cover are separately pre-formed to their final contour. Then the foam cushion is formed between the pan and cover while they are maintained in their desired spaced relationship in an appropriate fixture. Thereafter, epoxy resin mixed with an appropriate hardener (sometimes referred to as catalyst) is applied to the bottom side of the terminal portion 18 and the same is placed in contact with the inside surface of the C-shaped edge. Then the liquid bonding agent is applied to the top surface of the terminal portion whereafter the lobe 20 is forced past the jaw 28 to a position as shown in FIG. 2. As the lobe is forced into this position, a portion of the bonding material applied to the top of the terminal portion is displaced and forced into the mentioned space between the lobe and jaw 28. After the described assembly the bonding material is permitted to dry at which time it serves to bond the lobe and tongue to each other as well as to the edge of the seat pan. The use of epoxy resin as a bonding agent has been found to provide the required strength for the described connection between the seat cover and seat structure. However, it should be apparent to those skilled in the art that the broad objects of this invention will also be attained when using other bonding materials, as for example, polyesters, phenolics, or other suitable bonding materials.

The welt is made of flexible plastic material, such as vinyl, and its lobe 20 is only somewhat larger than the space provided between the edge of jaw 28 and the terminal portion 18. For this reason only hand pressure is required to force the lobe into the position shown in FIG. 2.

The lobe 20 could be of a cross-sectional area smaller than the space between the edge 28 and the terminal portion 18, in which case the bonding material seepage, and wear of the seat cover would be eliminated; however, the interlock would not be as strong as that provided with the aforedescribed larger lobe, and for this reason the former design is thought to be preferable.

However, the bonding material, which fills the space between lobe 20 and jaw 28 firms therein while bonding itself to the lobe and increases the width of the firm mass within the C-shaped edge and therefore forms a mechanical interlock therewith as well as serving as a bonding agent between the lobe, terminal portion and edge.

The lobe 30 does not add to the strength of the connection between the seat cover and pan, but merely serves to shield the edge of the jaw 28, which in some instances may have sufficiently sharp portions to warrant shielding.

The welt may be a vinyl extrusion, which may be made or purchased in rolls and may be cut to length and bent to the contour of the seat pan in assembly. The seat cover may be of synthetic rubber, as for example, of the type as marketed by E. I. du Pont de Nemours & Co., Inc., under the trademark Hypalon, which is treated and vulcanized to the contour of the seat.

Although but a single embodiment of the present invention has been illustrated and described, it will be apparent to those skilled in the art that various changes and modifications may be made therein without departing from the spirit of the invention or from the scope of the appended claims.

We claim:

1. Means for securing a seat cover to the base structure of a seat comprising, a C-shaped member formed on the periphery of the base structure and receiving a terminal cover portion of the cover and a welt which is of larger cross-section than the distance between the edge of one jaw of said C-shaped member and said cover portion, said cover portion and said welt being bonded to each other, said welt being bonded to the upper inside portion of said C-shaped member by a bonding material, said terminal portion being bonded to the lower inside surface of said C-shaped member, said bonding material, after being hardened in assembly of the combination, forming a firm and relatively thick layer between said welt and the inside surface of said C-shaped member when compared to the layer between said terminal portion and said inside surface, to thereby proivde firm material in addition to said welt which will resist a force tending to pull the welt and cover from the engaged position within said C-shaped member.

2. The combination according to claim 1 wherein said base structure is a seat pan and wherein said C-shaped member is integral with said seat pan.

3. The combination according to claim 2 wherein said bonding material is an epoxy resin.

4. The combination according to claim 3 wherein said cover is of synthetic rubber.

5. The combination according to claim 4 wherein said welt is of resilient vinyl plastic.

6. The method of securing a seat cover to the base structure of a seat of the type where a C-shaped member is provided on the periphery of the base structure and where the terminal portion of the seat cover and a welt are received therein in the C-shaped member, comprising the steps of: providing a liquid bonding material on both sides of the terminal portion and inserting said terminal portion in the C-shaped member so that one side of said terminal portion lies against a portion of the inside surface of said C-shaped member, providing the welt of a cross-section larger than the distance between the edge of one jaw of said C-shaped member and said terminal portion and pressing said welt into said C-shaped member; said welt (when it has been fully pressed into said C-shaped member) leaving a space between the upper surface of said welt and the upper inside surface of said C-shaped member, and said bonding material being forced into said space as said welt is pressed into said C-shaped member so that a substantially greater portion of said bonding material is in said space than between said terminal portion and said welt, and drying said bonding material to cause the same to bond said welt and terminal portion to each other and to the inside surface of said C-shaped member as well as to form a mechanical interlock between said welt and said C-shaped member.

7. The method according to claim 6 wherein said bonding agent is epoxy resin and said welt is of vinyl plastic.

8. A method according to claim 7 wherein said cover is of synthetic rubber.

References Cited by the Examiner

UNITED STATES PATENTS

| | | | |
|---|---|---|---|
| 2,099,200 | 11/1937 | Findora | 5—353.3 |
| 2,833,342 | 5/1958 | Swenson | 5—353.3 |
| 3,001,824 | 9/1961 | Wiemer | 5—353.2 |
| 3,040,343 | 6/1962 | Neely | 5—353.2 |
| 3,082,038 | 4/1963 | Sanderson | 5—353.2 |
| 3,139,307 | 6/1964 | Hawley et al. | 297—454 |

FOREIGN PATENTS 1,201,822   1/1960   France.

FRANK B. SHERRY, *Primary Examiner.*

C. A. NUNBERG, *Assistant Examiner.*